US008548455B2

(12) United States Patent
Kent et al.

(10) Patent No.: US 8,548,455 B2
(45) Date of Patent: *Oct. 1, 2013

(54) METHOD AND SYSTEM FOR INSTALLATION AND CONFIGURATION OF A FEMTOCELL

(75) Inventors: Mark Kent, Vista, CA (US); Charles Abraham, Los Gatos, CA (US); Xuemin Sherman Chen, San Diego, CA (US); Wael William Diab, San Francisco, CA (US); Vinko Erceg, Cardiff, CA (US); Victor T. Hou, La Jolla, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 857 days.

This patent is subject to a terminal disclaimer.

(21) Appl. No.: 12/355,444

(22) Filed: Jan. 16, 2009

(65) Prior Publication Data

US 2010/0184423 A1 Jul. 22, 2010

(51) Int. Cl.
*H04W 4/00* (2009.01)

(52) U.S. Cl.
USPC ...... 455/422.1; 455/419; 455/420; 455/432.1; 455/436; 455/442

(58) Field of Classification Search
USPC . 370/331–338; 455/432.1–453, 456.1–456.3
See application file for complete search history.

(56) References Cited

U.S. PATENT DOCUMENTS

| 2001/0031625 | A1* | 10/2001 | Lynn | 455/67.1 |
|---|---|---|---|---|
| 2003/0174671 | A1* | 9/2003 | Chen | 370/329 |
| 2006/0209795 | A1 | 9/2006 | Chow et al. | |
| 2007/0121655 | A1 | 5/2007 | Jin | |
| 2008/0216145 | A1 | 9/2008 | Barton et al. | |
| 2008/0244148 | A1 | 10/2008 | Nix, Jr. et al. | |
| 2009/0042536 | A1 | 2/2009 | Bernard et al. | |
| 2009/0061873 | A1 | 3/2009 | Bao et al. | |
| 2009/0092081 | A1 | 4/2009 | Balasubramanian et al. | |
| 2009/0098858 | A1 | 4/2009 | Gogic | |

(Continued)

FOREIGN PATENT DOCUMENTS

WO 2007/000455 1/2007

OTHER PUBLICATIONS

Unpublished U.S. Appl. No. 12/391,009, filed Feb. 23, 2009.
Unpublished U.S. Appl. No. 12/395,470, filed Feb. 27, 2009.

(Continued)

*Primary Examiner* — Dai A Phuong
(74) *Attorney, Agent, or Firm* — Sterne, Kessler, Goldstein & Fox P.L.L.C.

(57) ABSTRACT

Aspects of a method and system for installation and configuration of a femtocell are provided. In this regard, information for configuring a femtocell to operate in a specified location may be received by the femtocell and may be utilized to configure one or more parameters of the femtocell. Once the femtocell is operational the parameters may be updated and/or optimized based on one or both of characterizations of cellular signals and/or information received from a femtocell registry. In this manner the femtocell may be reconfigured utilizing the updated and/or optimized parameters. The one or more parameters may be configured based on attributes of the location in which the femtocell is to operate. The one or more parameters may be configured based on a location, number, and/or coverage area of other femtocells. The parameters may comprise one or more of: power levels, frequency of operation, and/or antenna beam pattern.

22 Claims, 6 Drawing Sheets

(56) References Cited

U.S. PATENT DOCUMENTS

| | | |
|---|---|---|
| 2009/0164547 A1 | 6/2009 | Ch'ng |
| 2009/0279430 A1 | 11/2009 | Huber et al. |
| 2009/0288144 A1 | 11/2009 | Huber et al. |
| 2009/0292799 A1 | 11/2009 | Eisener et al. |
| 2009/0316649 A1 | 12/2009 | Chen |
| 2010/0118844 A1* | 5/2010 | Jiao et al. ............ 370/338 |
| 2010/0165862 A1* | 7/2010 | Nylander et al. ......... 370/252 |
| 2010/0167734 A1 | 7/2010 | Jones et al. |
| 2010/0182991 A1 | 7/2010 | Abraham et al. |
| 2010/0184411 A1 | 7/2010 | Chen et al. |
| 2010/0184414 A1 | 7/2010 | Abraham et al. |
| 2010/0184450 A1 | 7/2010 | Chen |
| 2010/0186027 A1 | 7/2010 | Hou et al. |
| 2010/0203891 A1* | 8/2010 | Nagaraja et al. ......... 455/436 |
| 2010/0210239 A1 | 8/2010 | Karaoguz et al. |
| 2010/0220642 A1 | 9/2010 | Abraham et al. |
| 2010/0220692 A1 | 9/2010 | Diab et al. |
| 2010/0220731 A1 | 9/2010 | Diab et al. |
| 2010/0222054 A1 | 9/2010 | Abraham et al. |
| 2010/0222069 A1 | 9/2010 | Abraham et al. |
| 2010/0238836 A1 | 9/2010 | Diab et al. |

OTHER PUBLICATIONS

Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.
Unpublished U.S. Appl. No. 12/406,835, filed Mar. 18, 2009.
European Search Report corresponding to European Patent Application No. 10001341.6-1244, dated Jul. 5, 2010.

* cited by examiner

METHOD AND SYSTEM FOR INSTALLATION AND CONFIGURATION OF A FEMTOCELL

CROSS-REFERENCE TO RELATED APPLICATIONS/INCORPORATION BY REFERENCE

Not Applicable

FIELD OF THE INVENTION

Certain embodiments of the invention relate to communications. More specifically, certain embodiments of the invention relate to a method and system for installation and configuration of a femtocell.

BACKGROUND OF THE INVENTION

A femtocell is a small base station that may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for installation and configuration of a femtocell substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for installation and configuration of a femtocell. In various exemplary embodiments of the invention, information for configuring a femtocell to operate in a specified location may be received by the femtocell and may be utilized to configure one or more parameters of the femtocell. Once the femtocell is operational, the parameters may be updated or optimized based on one or both of characterizations of cellular signals and/or information received from a femtocell registry. In this manner, the femtocell may be reconfigured utilizing the updated parameters. The one or more parameters may be configured based on attributes of the location in which the femtocell is to operate. The attributes may comprise one or more of geographical, topographical, and structural attributes. The one or more parameters may be configured based on a location, number, and/or coverage area of other femtocells. The location, number, and/or coverage area of the other femtocells may be determined based on information gathered by mobile cellular communication devices. The location, number, and/or coverage area of the other femtocells may be determined via the femtocell registry. The cellular signals may be received and characterized by the femtocell. The cellular signals may be received and characterized by one or more other femtocells and results of said characterizations may be communicated to the femtocell and/or stored in the registry. The one or more parameters may comprise one or more of: power levels, frequency of operation, and/or antenna beam pattern. The femtocell may periodically enter a test mode to perform the reconfiguring. One or both of the configuring and/or reconfiguring may be performed via a femtocell management entity communicatively coupled to the femtocell.

Figure 1A:
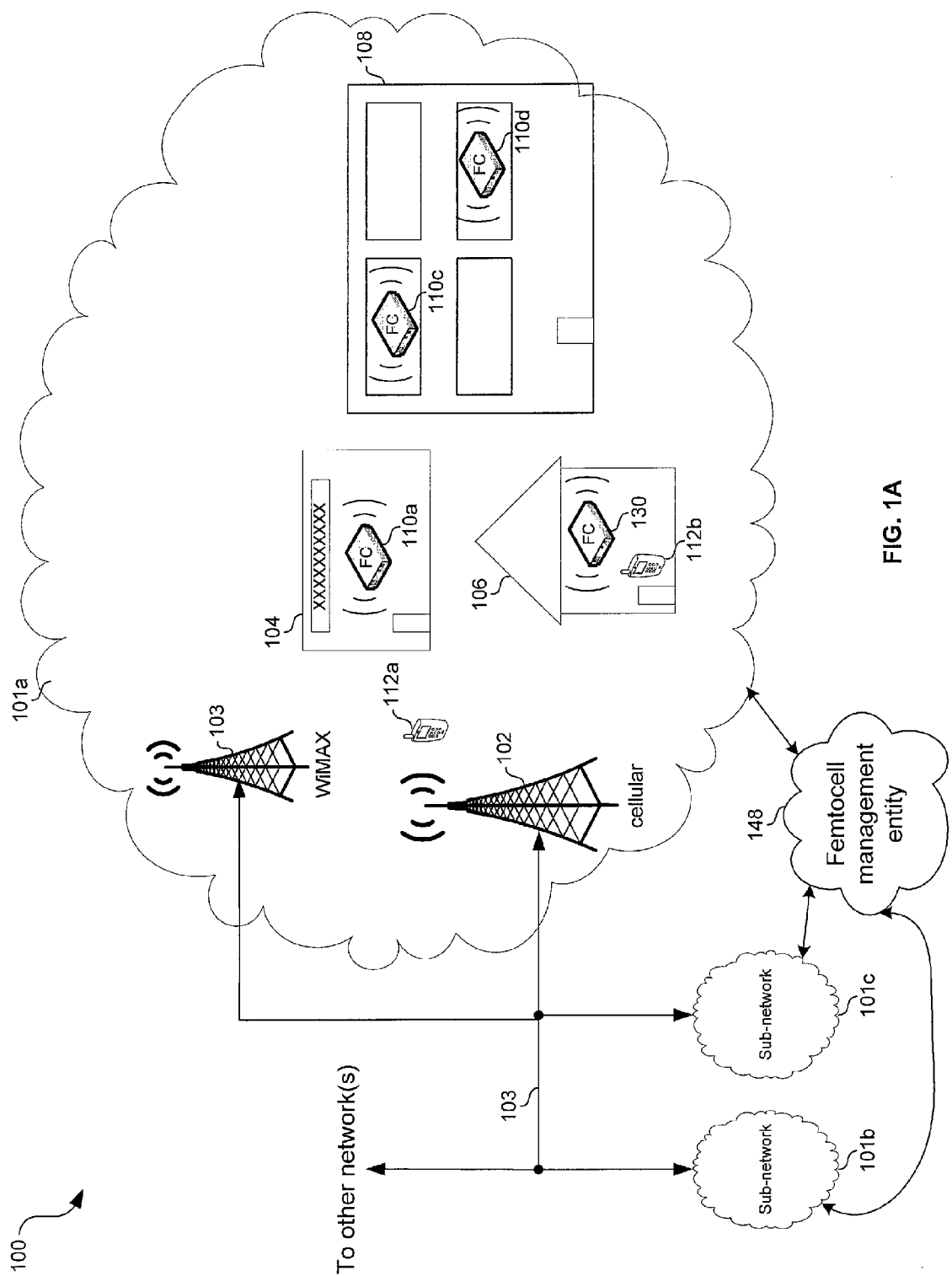
FIG. 1A is a diagram illustrating dynamic adjustment of power and frequencies in a femtocell network, in accordance with an embodiment of the invention.

FIG, 1A is a diagram illustrating dynamic adjustment of power and frequencies in a femtocell network, in accordance with an embodiment of the invention. Referring to FIG. 1A, there is shown a cellular network 100 comprising cellular sub-networks 101a, 101b, and 101c, and a femtocell management entity 148. The exemplary cellular sub-network 101a may comprise a cellular base station 102, a WiMAX base station 103, a plurality of installed femtocells 110a, 110c and 110d, which are collectively referred to herein as femtocells 110, a femtocell 130 that needs to be installed, and cellular enabled communication devices 112a and 112b, which are collectively referred to herein as cellular enabled communication devices 112. The femtocells 110 and the femtocell 130 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The cellular base station 102 may be operable to communicate data wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The cellular base station 102 may communicate with cellular enabled communication devices such as the cellular enabled communication devices 112. Exemplary cellular standards supported by the cellular base station 102 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). The cellular base station 102 may communicate data amongst the various components of the sub-network 101a. Additionally, data communicated to and/or from the cellular base station 102 may be communicated to sub-network 101b, sub-network 101c, and/or to one or more other networks (not shown) via one or more backhaul links 103. In this manner, data communicated to and/or from the cellular base station 102 may be communicated to and/or from, other portions of the network 100 and/or other networks. Exemplary networks with which data may be communicated may comprise public switched telephone networks (PSTN) and/or IP networks such as the Internet or an intranet.

The WiMAX base station 103 may be operable to communicate data wirelessly in accordance with WiMAX standards and/or protocols. The protocols utilized by the WiMAX base station 103 may be based on the IEEE 802.16 standard, developed or maintained by the WiMAX (IEEE 802.16) forum, and/or may also comprise proprietary protocols. In some instances that WiMAX base station 103 and the cellular base station 102 may be co-located.

The femtocell management entity 148 may comprise suitable logic, circuitry, and/or code for managing one or more operating parameters of one or more installed femtocells 110 and the femtocell 130 subsequent to its installation.

The femtocells 110 and the femtocell 130 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. In this regard, the femtocells 110 and the femtocell 130 subsequent to its installation may each communicate with cellular enabled communication devices such as the cellular enabled communication devices 112. Exemplary cellular standards supported by the femtocells 110 and the femtocell 130 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). Additionally, the femtocells 110 and the femtocell 130 may each comprise suitable logic, circuitry, and/or code that may be operable to communicate over a broadband network (not shown in FIG. 1A).

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players, for example. The cellular enabled communication devices 112 may be enabled to receive, process, and present multimedia content and may additionally be enabled to run a network browser or other applications for providing Internet services to a user of the cellular enabled communication device 112.

The cellular enabled communication devices 112 may gain access to the cellular network 100 and/or to other communication networks via cellular communications with the cellular base station 102, the WiMAX base station 103, the femtocells 110, and/or the femtocell 130 subsequent to its installation. In this regard, in instances that a reliable connection may be established between the cellular base station 102 and a cellular enabled communication device 112, the data may be communicated between the cellular enabled communication device 112 and the cellular base station 102. In instances that a reliable connection may be established between the WiMAX base station 103 and a cellular enabled communication device 112, the data may be communicated between the cellular enabled communication device 112 and the WiMAX base station 103. Alternatively, in instances that a reliable connection may be established between a femtocell 110 or 130 and a cellular enabled communication device 112, data may be communicated between the cellular enabled communication device 112 and the femtocell 110 or 130.

In this regard, access by a cellular enabled communication device 112 to a femtocell 110 or 130 may comprise an ability of the cellular enabled communication device 112 to establish one or more cellular communication channels with a femtocell 110 or 130. The cellular communication channels between the cellular enabled communication device 112 and the femtocell 110 or 130 may enable the cellular enabled communication device 112 to exchange data with, for example, other cellular enabled communication devices, landline telephones, and/or network nodes such as fileservers, which may be communicatively coupled to a local area network and/or the Internet. Accordingly, the femtocells 110 and 130 may extend the cellular coverage area in the sub-network 101a. In particular, the femtocells 110 and 130 may extend or improve cellular coverage indoors or locations out of range of a base station or WiMAX base station.

In operation, the femtocells 110 may be installed and configured to optimize cellular coverage in the sub-network 101a while maintaining interference at or below acceptable levels. In this regard, location, frequency of operation, antenna beam pattern, and/or transmit power level of one or more of the femtocells 110 may be intelligently managed.

Prior to installation of the femtocell 130 an owner of the residential property 106 may contact a cellular service provider and request installation of a femtocell. The service provider may utilize information pertaining to the residential property 106 as well as information about nearby femtocells, cellular base stations, and/or WiMAX base stations and may determine whether installing a femtocell in the residential property 106 may be feasible. Exemplary Information utilized to determine suitability of femtocell installation may comprise a location of the property 106, a layout and/or structure of the property 106, terrain surrounding the property, the number and/or location of nearby femtocells, and the number and/or location of nearby base stations. The service provider may determine whether a femtocell in the residential property 106 may critically interfere with other femtocells or base stations. In this regard, the service provider may attempt to manipulate various operating parameters of the femtocell, such as transmit power, antenna beam pattern, and operating frequency, to see if a suitable configuration exists. In the exemplary embodiment of the invention depicted, a suitable configuration was determined and the femtocell 130 was installed in the residential property 106.

Subsequent to installation, one or more of the operating parameters may be adjusted and/or reconfigured to optimize the installation. For example, operating parameters may be adjusted based on measurements performed by the femtocell 130 and/or the other femtocells 110. Additionally and/or alternatively, operating parameters may be adjusted based on changing conditions, topologies, and/or devices within the sub-network 101a.

In various embodiments of the invention, configuration of one or more of the femtocells 110 may be performed based on messages exchanged with the femtocell management entity 148. Additionally and/or alternatively, the management entity 148 may utilize the received information to update a femtocell registry which it may maintain.

Figure 1B:
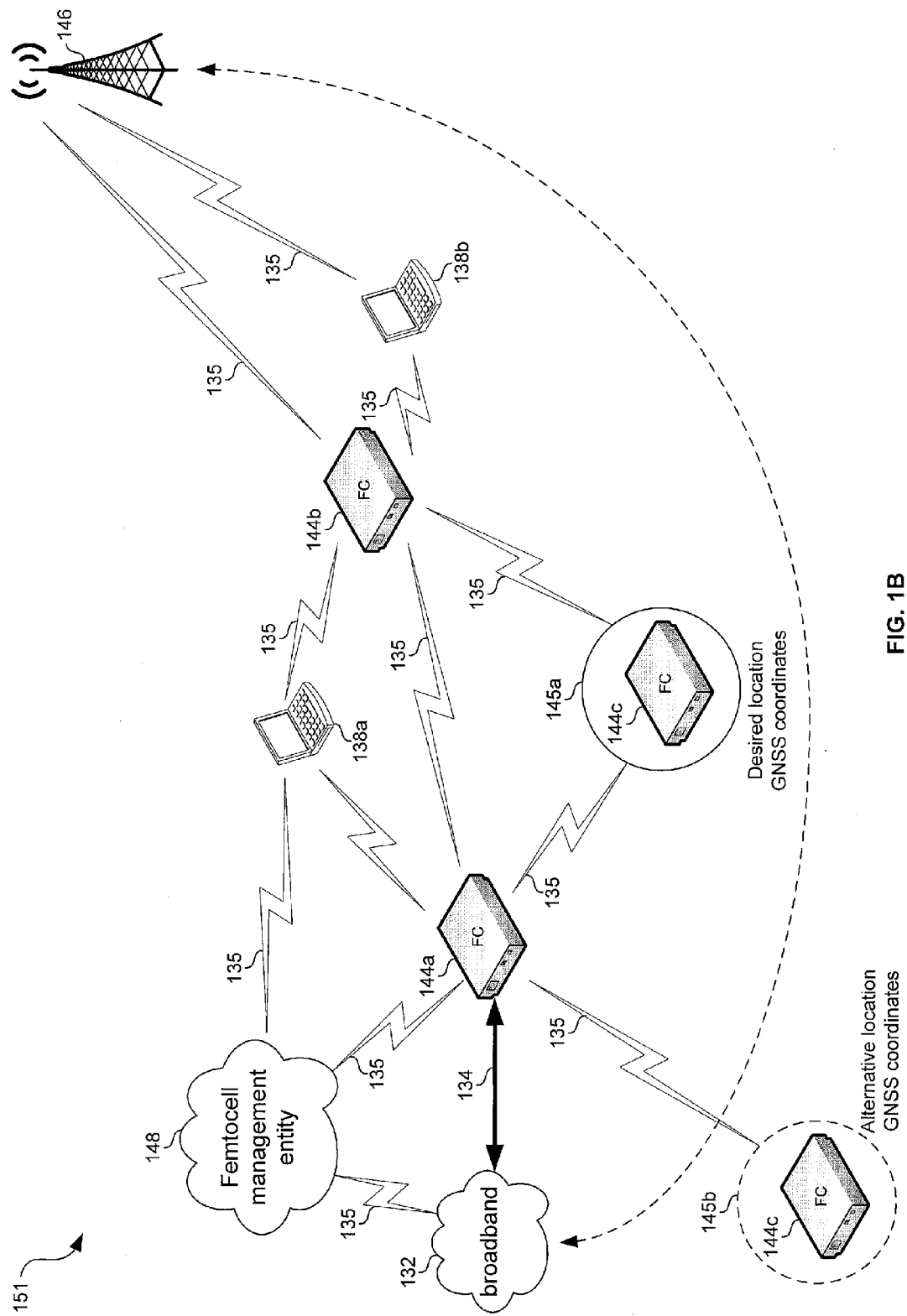
FIG. 1B is a diagram illustrating evaluating deployment of femtocells as part of a cellular network by a user, in accordance with an embodiment of the invention.

FIG. 1B illustrates site evaluation for deployment of femtocells as part of a cellular network, in accordance with an embodiment of the invention. Referring to FIG. 1B, there is shown a femtocell management entity 148, a plurality of installed femtocells 144a and 144b, a femtocell 144c that may be installed at either a desired location 145a or an alternative location 145b, cellular enabled communication devices 138a and 138b, collectively referred to herein as cellular enabled communication devices 138, and cellular and/or WiMAX base station 146. The femtocell 144a may be communicatively coupled to a broadband network 132 via a link 134. Notwithstanding, the invention may not be so limited, and other locations may be utilized for installation of the femtocell without limiting the scope of the invention.

The cellular and/or WiMAX base station 146 may be similar to or the same as the base stations 102 and/or 103 described with respect to FIG. 1A, for example. The cellular enabled communication devices 138 may be similar to or the same as the cellular enabled communication devices 112 described with respect to FIG. 1A, for example. The femtocells 144a, 144b and 144c may be similar to or the same as the femtocells 110 described with respect to FIG. 1A, for example.

The broadband network 132 may comprise one or more network devices and/or network links operable to transmit and/or receive data. The broadband network 132 may provide access to the Internet and/or one or more private networks. The link 134 may comprise a broadband link such as a digital subscriber line (DSL), a T1/E1 line, a cable television infrastructure, a satellite television infrastructure, and/or a satellite broadband Internet link. The link 134 may comprise one or more optical, wired, and/or wireless links.

The cellular enabled communication device 138a and the cellular enabled communication device 138b may communicate via the femtocell 144a and 144b, the cellular and/or WiMAX base station 146, and the broadband network 132. For example, the cellular enabled communication device 138a may transmit data to the femtocell 144a utilizing one or more cellular standards. In this regard, the femtocell 144a may packetize the data into one or more IP packets and the IP packets may be further encapsulated, encoded, modulated, or otherwise processed. The IP packets may then be routed via the broadband network 132 to the cellular and/or WiMAX base station 146. In some instances, the cellular and/or WiMAX base station 146 may utilize IP backloading and the IP packets may be conveyed to the cellular and/or WiMAX base station 146. In other instances, the IP packets may be transcoded via one or more network elements (not shown in FIG. 1B) to a format supported by the cellular and/or WiMAX base station 146. The data may then be extracted from the IP packets, transcoded to a format suitable for cellular transmission, and subsequently transmitted to the cellular enabled communication device 138*b*.

In operation, whether the location 145*a* or the location 145*b* is suitable for installation of the femtocell 144*c* may be intelligently determined. Furthermore, after installation of the femtocell 144*c*, one or more operating parameters of one or more of the femtocells 144*a*, 144*b*, and 144*c* may be adjusted to optimize cellular coverage and interference in the network 151.

Installation of the femtocell 144*c* may begin with determining whether the location 145*a* is a suitable location. In this regard, the location 145*a* may described by its GNSS coordinates. In one embodiment of the invention, an owner of the femtocell 144*c* may be enabled to enter global navigation system satellite (GNSS) coordinates of a desired location 145*a*. In another embodiment of the invention, the femtocell 144*c* may be operable to determine its location based on, for example, a GNSS receiver within or communicatively coupled to the femtocell 144*c*. In another embodiment of the invention, the femtocell 144*c* may be operable to determine its location based on assisted GNSS information that may be received from an assisted GNSS server. Notwithstanding the manner in which the GNSS coordinates are obtained, it may subsequently be determined whether the desired location 145*a* is suitable for installation of the femtocell 144*c*.

Suitability of the location 145*a* may be determined based on one or more exemplary operating parameters comprising frequency of operation, power levels, and/or antenna beam patterns of the installed femtocells 144*a* and 144*b*, the cellular enabled communication devices 138*a* and 138*b*, and the cellular and/or WiMAX base station 146. The parameters may be communicated amongst two or more of the installed femtocells 144*a* and 144*b*, the cellular enabled communication devices 138*a* and 138*b*, and the cellular and/or WiMAX base station 146 via one or more cellular links 135 and/or one or more broadband links 134. Each of the cellular links 135 may be enabled to communicate the one or more operating parameters wirelessly utilizing one or more of: IS-95, CDMA, GSM, TDMA, GPRS, EDGE, UMTS, WCDMA, TD-SCDMA and/or HSDPA cellular standards. The operating parameters may have been previously determined based on measurements and/or characterizations performed by one or more of the installed femtocells 144*a* and 144*b*, the cellular enabled communication devices 138, the cellular and/or WiMAX base station 146, and/or the femtocell management entity 148. The operating parameters may have been previously stored in a femtocell registry.

In various exemplary embodiments of the invention, suitability of a location may be determined by the femtocell management entity 148. In this regard, the parameters may be communicated to the femtocell management entity 148 and/or the femtocell management entity 148 may comprise the femtocell registry which may store the parameters. Accordingly, the femtocell management entity 148 may utilize the parameters of the installed network devices to determine if there exists a configuration of the femtocell 144*c* in the location 145*a* that achieves desired coverage area and interference levels in the network 151.

Suitability of the location 145*a* may be based, at least in part, on location attributes. Exemplary location attributes may comprise geographical, topographical, or structural attributes. Geographical attributes may comprise, for example, whether the location is rural or urban; whether there are other nearby femtocells, cellular and/or WiMAX base stations, or other known sources of interference; elevation; and/or weather patterns in the area. Topographical attributes may comprise, for example, whether the area is wooded or mountainous. Structural attributes may comprise, for example, a floor plan, a blueprint, and building materials of the structure in which installation is desired. In some embodiments of the invention, the location information may be stored in a femtocell registry. In some embodiments of the invention, one or more maps comprising the location information may be generated. Exemplary maps may be generated and/or maintained by a service provider deploying the femtocells, by a centralized entity and/or organization, and/or via information communicated from mobile cellular enabled communication devices as they detect and communicate with femtocells.

In various exemplary embodiments of the invention, suitability of a location may be determined by the femtocell management entity 148. In this regard, a map and/or femtocell registry may be utilized by the femtocell management entity 148 to determine if there exists a configuration of the femtocell 144*c* in the location 145*a* that achieves desired coverage area and interference levels in the network 151.

When determining whether the location 145*a* may be suitable for installation of the femtocell 144*c*, possible re-configurations of the installed femtocells 144*a* and 144*b* may be explored. In this regard, it may be determined whether the femtocells 144*a* and 144*b* may be configured to accommodate the femtocell 144*c* at the location 145*a* while maintaining acceptable levels of interference in desired coverage area(s) of the three femtocells 144*a*, 144*b*, and 144*c*.

If the desired location 145*a* is suitable for installation of the femtocell 144*c*, the femtocell 144*c* may be installed at the desired location 145*a*. If the desired location 145*a* is not suitable for installation of the femtocell 144*c*, it may be determined whether the alternative location 145*b* is suitable for installation of the femtocell 144*c*. Determination of whether the location 145*b* is suitable for installation of the femtocell 144*c* may be similar to the determination with respect to location 145*a*. If the alternative location 145*b* is suitable for installation of the femtocell 144*c*, the femtocell 144*c* may be installed at the alternative location 145*b*. If the alternative location 145*b* is not suitable for installation of the femtocell 144*c*, additional location options may be explored or the femtocell 144*c* may not be installed.

Subsequent to installation of the femtocell 144*c* at the desired location 145*a* or alternative location 145*b*, one or more of the installed femtocells 144*a*, 144*b*, and 144*c*, the cellular enabled communication devices 138, the cellular and/or WiMAX base station 146, and/or the femtocell management entity 148 may measure and/or characterize the environment around it. For example, one or more devices of the installed femtocells 144*a*, 144*b*, and 144*c*, the cellular enabled communication devices 138, the cellular and/or WiMAX base station 146, and/or the femtocell management entity 148 may measure signal to noise ratio (SNR), signal to interference noise ratio (SINR), carrier to noise ratio (CNR), and/or carrier to interference noise ratio (CINR). These measurements may be utilized to adjust one or more operating parameters of the femtocells 144*a*, 144*b*, and/or 144*c* to optimize coverage areas and interference in the network 151. Additionally and/or alternatively, one or more devices in the network 151 may collect data to characterize usage patterns of the femtocells 144*a*, 144*b*, and 144*c*. In various exemplary embodiments of the invention, characterizations and/or measurements may be communicated to the femtocell management entity 148 and the femtocell management entity 148 may utilize such information to optimize a configuration of one or more of the femtocells 144*a*, 144*b*, and 144*c*. In various exemplary embodiments of the invention, the femtocell 144*c* may enter a test mode for adjusting operating parameters before it becomes fully operational to enable communication with one or more cellular enabled communication devices.

Figure 1C:
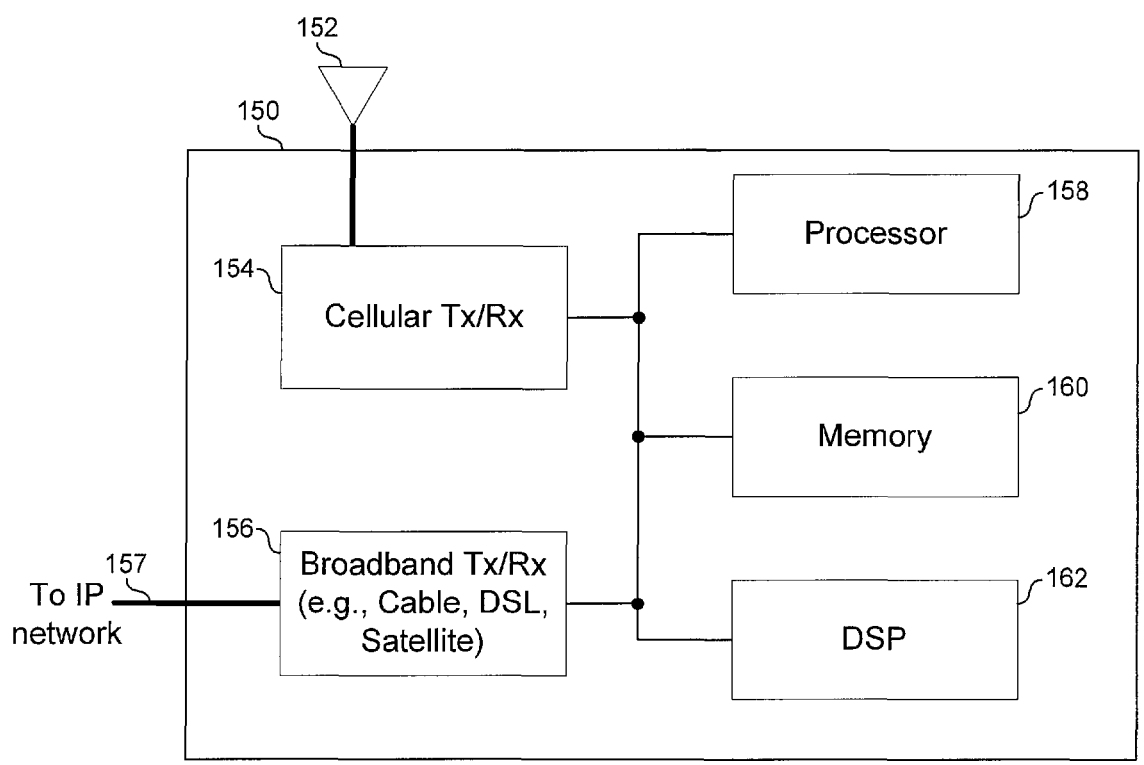
FIG. 1C is a block diagram of an exemplary femtocell, in accordance with an embodiment of the invention.

FIG. 1C is a block diagram of an exemplary femtocell, in accordance with an embodiment of the invention. Referring to FIG. 1C, there is shown a femtocell 150 comprising an antenna 152, a cellular transmitter and/or receiver (Tx/Rx) 154, a broadband transmitter and/or receiver (Tx/Rx) 156, a processor 158, a memory 160, and a digital signal processor (DSP) 162. The femtocell 150 may be similar to or the same as the femtocells 110 described with respect to FIG. 1B.

The antenna 152 may be suitable for transmitting and/or receiving cellular signals. Although a single antenna is illustrated, the invention may not be so limited. In this regard, the cellular Tx/Rx 154 may utilize a common antenna for transmission and reception, or may utilize different antennas for transmission and reception, and/or may utilize a plurality of antennas for transmission and/or reception. The radiation pattern or directionality of the antenna 152 may be controlled via one or more control signals from, for example, the processor 158.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the femtocells 110 may be specified in the International Mobile Telecommunications-2000 (IMT-2000) standard developed by the $3^{rd}$ generation partnership project (3GPP) and/or the $3^{rd}$ generation partnership project 2 (3GPP2). The cellular Tx/Rx 154 may be operable to transmit and/or receive on one or more frequencies and/or channels. The cellular Tx/Rx 154 may also comprise a received signal strength indicator for characterizing an environment in which the femtocell 150 resides.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the broadband link 157 which may be a T1/E1 line, optical fiber, DSL, cable television infrastructure, satellite broadband internet connection, satellite television infrastructure, and/or Ethernet.

The processor 158 may comprise suitable logic, circuitry, and/or code that may enable processing data and/or controlling operations of the femtocell 150. The processor 158 may be enabled to provide control signals to the various other portions of the femtocell 150. The processor 158 may be operable to control transmit power, frequency, and channel or the cellular Tx/Rx 154 and/or beam pattern of cellular signals transmitted via the antenna 152. The processor 158 may be operable to control portions of the femtocell 150 based on measurements and/or characterizations of signals incident on the antenna 152, based on parameters received from other femtocells or cellular enabled communication devices, and/or based on usage of the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160. In various embodiments of the invention, the applications, programs, and/or code may enable detecting interference incident on the antenna 152. In various embodiments of the invention, the applications, programs, and/or code may enable controlling transmit power, frequencies, and/or channels utilized by the cellular Tx/Rx 154. In various embodiments of the invention, the applications, programs, and/or code may enable collecting information to determine usage patterns of the femtocell 150.

The memory 160 may comprise suitable logic, circuitry, and/or code that may enable storage or programming of information that includes operating parameters and/or code that may effectuate the operation of the femtocell 150. The operating parameters may comprise configuration data and the code may comprise operational code such as software and/or firmware, but contents of the memory 160 need not be limited in this regard. Moreover, the memory 160 may store adaptive filter and/or block coefficients. Additionally, the memory 160 may buffer or otherwise store received data and/or data to be transmitted. In various embodiments of the invention, the memory 160 may comprise one or more look-up tables or other data structures which may comprise information for controlling antenna beam pattern, transmit power of the cellular Tx/Rx 154, and/or frequencies and/or channels on which the cellular Tx/Rx 154 transmits and/or receives.

The DSP 162 may comprise suitable logic, circuitry, and/or code operable to perform computationally intensive processing of data. In various embodiments of the invention, the DSP 162 may encode, decode, modulate, demodulate, encrypt, and/or signals. In various embodiments of the invention, the DSP 162 may be operable to detect interference and/or control antenna beam pattern, transmit power of the cellular Tx/Rx 154, and/or frequencies and/or channels on which the cellular Tx/Rx 154 transmits and/or receives. The DSP 162 may be operable to perform, for example, fast Fourier transform analysis (FFT) of received signals to characterize an environment in which the femtocell 150 resides.

In operation, information may be exchanged, via the broadband Tx/Rx 156 and/or the cellular Tx/Rx 154, between the femtocell 150 and one or more other devices such as cellular and/or WiMAX base stations, femtocells, and/or femtocell management entities. Data received via the cellular Tx/Rx 154 and/or the broadband Tx/Rx 156 may be conveyed to the processor 158, memory 160, and/or the DSP 162 and may be utilized to control antenna radiation pattern, transmit power of the cellular Tx/Rx 154, and/or frequencies and/or channels on which the cellular Tx/Rx 154 transmits and/or receives. In various exemplary embodiments of the invention, other femtocells, cellular enabled communication devices, and/or base stations may characterize the environment in which they are operating and may communicate results of those characterizations over, for example, an IP network to which the femtocell 150 is communicatively coupled. In various exemplary embodiments of the invention, operating parameters of other femtocells may be communicated to the femtocell 150 via the broadband Tx/Rx 156. In various exemplary embodiments of the invention, the femtocell 150 may be operable to gather, via the broadband Tx/Rx 156 and/or the cellular Tx/Rx 154, information about usage of one or more femtocells.

Figure 1D:
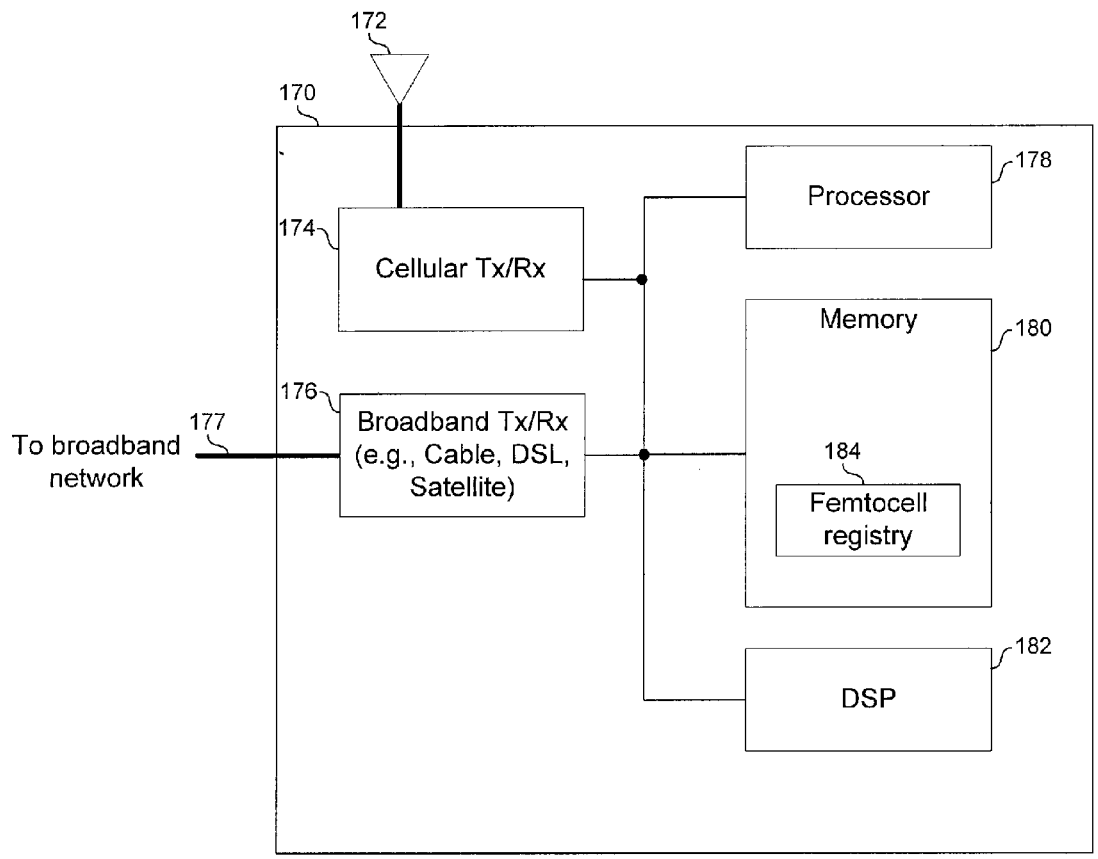

FIG. 1D is a block diagram of an exemplary femtocell management entity, in accordance with an embodiment of the invention. Referring to FIG. 1D, there is shown a femtocell management entity 170 comprising a broadband Tx/Rx 176, a processor 178, a memory 180 comprising a femtocell registry 184, and a DSP 182.

The antenna 172 may be similar to or the same as the antenna 152 described with respect to FIG. 1C. The cellular Tx/Rx 174 may be similar to or the same as the cellular Tx/Rx 154 described with respect to FIG. 1C. The broadband Tx/Rx 176 may be similar to or the same as the broadband Tx/Rx 156 described with respect to FIG. 1C.

The processor 178 may comprise suitable logic, circuitry, and/or code that may enable processing data and/or controlling operations of the femtocell management entity 170. The processor 178 may be enabled to provide control signals to the other portions of the femtocell management entity 170. The processor 178 may be operable to process information received via the cellular Tx/Rx 174 and/or the broadband Tx/Rx 176. The processor 178 may be operable to process the received information in order to control, for example, transmit power levels of one or more femtocells, frequencies and/or channels on which one or more femtocells operate, and/or radiation pattern of one or more femtocell antennas. The processor 178 may also control data transfers between various portions of the femtocell management entity 170. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of other portions of the femtocell management entity 170. In various embodiments of the invention, the applications, programs, and/or code may enable controlling operating parameters of one or more femtocells. In various embodiments of the invention, the applications, programs, and/or code may enable collecting information to determine usage patterns of one or more femtocells.

The memory 180 may comprise suitable logic, circuitry, and/or code that may enable storage or programming of information that includes operating parameters and/or code that may effectuate the operation of the femtocell management entity 170. The operating parameters may comprise configuration data and the code may comprise operational code such as software and/or firmware. Additionally, the memory 180 may comprise a femtocell registry 184 which may comprise a variety of information for managing one or more femtocells. Exemplary information stored in the registry may comprise information about the installation location of one or more femtocells, such as topographical, geographical, and/or structural information. Additionally, the registry 184 may comprise current and/or possible antenna radiation pattern, transmit power levels, and frequency and/or channels of operation of one or more femtocells. Also, the memory 180 may comprise information about usage history and/or patterns of one or more femtocells.

The DSP 1682 may comprise suitable logic, circuitry, and/or code operable to perform computationally intensive processing of data. In various embodiments of the invention, the DSP 182 may encode, decode, modulate, demodulate, encrypt, and/or decrypt signals. In various embodiments of the invention, the DSP 182 may be operable to perform calculations and/or analysis of information received from one or more femtocells in order to determine optimal operating parameters for the one or more femtocells.

In operation, information may be exchanged, via the broadband Tx/Rx 156 and/or the cellular Tx/Rx 154, between the femtocell management entity 170 and one or more femtocells, cellular enabled communication devices, and/or base stations. Data received via the cellular Tx/Rx 174 and/or broadband Tx/Rx 176 may be conveyed to the processor 158, memory 160, and/or the DSP 162 and may be utilized to control antenna radiation pattern, transmit power of the cellular Tx/Rx 154, and/or frequencies and/or channels of one or more femtocells. In various exemplary embodiments of the invention, femtocells, cellular enabled communication devices, and/or base stations may characterize the environment in which they are operating and may communicate results of those characterizations over, for example, an IP network to the femtocell management entity 170. In various exemplary embodiments of the invention, operating parameters determined by the femtocell management entity 170 may be communicated to one or more femtocells via the cellular Tx/Rx 154 and/or broadband Tx/Rx 156. In various exemplary embodiments of the invention, the femtocell 150 may gather, via the broadband Tx/Rx 156 and/or the cellular Tx/Rx 154, information about usage of one or more femtocells.

Figure 2:
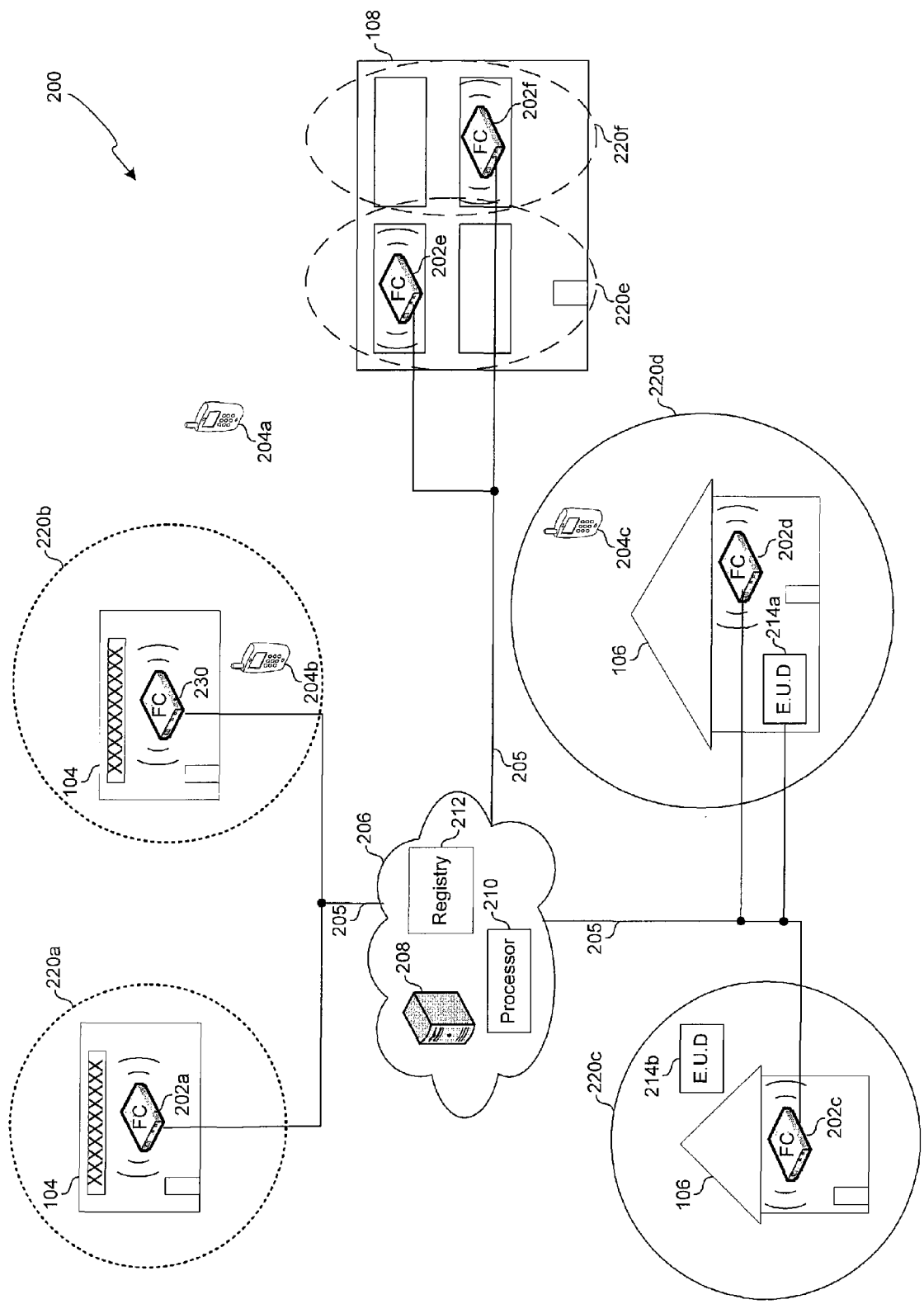
FIG. 2 is a diagram illustrating a geographic area comprising a plurality of femtocells managed via a management entity, in accordance with an embodiment of the invention.

FIG. 2 is a diagram illustrating a geographic area comprising a plurality of femtocells managed via a management entity, in accordance with an embodiment of the invention. Referring to FIG. 2, there is shown a communication system 200. The communication system 200 may comprise a plurality of commercial properties 104, residential properties 106, multi-tenant properties 108, a plurality of installed femtocells 202a, 202c, 202d, 202e and 202f, a femtocell 230 that needs to be installed, a plurality of cellular enabled communication devices 204a, 204b and 204c, end-user communication devices 214a and 214b, and a femtocell management entity 206.

The commercial properties 104, the residential properties 106, and the multi-tenant properties 108 may be substantially as described with respect to FIG. 1A. The cellular enabled communication devices 204a, 204b, and 204c may be similar to or the same as the cellular enabled communication devices 112a and 112b (FIG. 1A) and/or 138a and 138b (FIG. 1B). Exemplary cellular enabled communication devices comprise cell phones and laptops with a cellular data card. In some instances, the cellular enabled communication devices 204a, 204b, and 204c may be enabled to communicate with the femtocell management entity 206.

Each of the end-user communication devices 214a and 214b may comprise one or more of a cellular enabled communication device, similar to or the same as the devices 204a, 204b, and 204c, a wireless communication device such as a Bluetooth and/or Wi-Fi enabled device, and/or a wired communication device such as a computer with an Ethernet port. The end-user communication device 214a and 214b may be operable to communicate with the femtocell management entity 206.

The plurality of femtocells 202a, 202c, 202d, 202e and 202f, which are collectively referred to as femtocells 202, and the femtocell 230 may be similar to or the same as the femtocells 110 (FIG. 1A), 144 (FIG. 1B), and/or 150 (FIG. 1C).

The femtocells 202 may each be enabled to communicate with the femtocell management entity 206 via, for example, an IP connection.

The femtocell management entity 206 may comprise suitable logic, circuitry, and/or code for managing operating parameters of one or more of the installed femtocells 202a, 202c, 202d, 202e and 202f. In various embodiments of the invention, the femtocell management entity 206 may comprise an application specific device or plurality of devices. Alternatively, the femtocell management entity 206 may reside on and/or be enabled by one or more servers 208, a processor 210, and/or a registry 212, which may comprise various operating parameters of one or more of the femtocells 202 and information about the locations of the femtocells 202. For example, the femtocell management entity 206 may comprise one or more web pages, databases, and/or web based applications which may be accessed via an IP network.

In accordance with an embodiment of the invention, the processor 210 in the femtocell management entity 206 may be operable to receive information from one or more of the installed femtocells 202 and/or one or more of the cellular enabled communication device 204. The processor 210 may be operable to determine a location for installation of the femtocell 230 based on the received information. The received information may comprise, for example, GNSS coordinates, interference measurements, power levels, and/or directionality of antennas of the one or more installed femtocells 202, gathered information from mobile cellular communication devices, and/or user input. The processor 210 may be operable to dynamically update the registry 212 based on the received information. The dynamically updated registry 212 may comprise one or more global navigation system satellite (GNSS) coordinates, an identification number and/or a list of the one or more operating parameters of each of the one or more installed femtocells 202.

In accordance with an embodiment of the invention, subsequent to installation of the femtocell 230, the femtocell 230 may be operable to measure interference from one or more of the installed femtocells 202 to determine whether location 220b is suitable for installation of the femtocell 230. The femtocell management entity 206 may be operable to adjust one or more operating parameters of the femtocells 202 to accommodate installation of the femtocell 230 at the desired location 220b.

In accordance with an embodiment of the invention, subsequent to installation of the femtocell 230, the femtocell 230 initially enters a test mode in which it may transmit test signals or otherwise operate with reduced capabilities until its operating parameters are adjusted to meet coverage area and/or interference requirements. Operating parameters of the femtocell 230 may be adjusted based on information received from one or more of the installed femtocells 202 and/or the femtocell management entity 206 and utilize the received information to adjust its operating parameters. Additionally and/or alternatively, operating parameters of the femtocell 230 may be adjusted based on measured interference and/or other characterization of the location 220b.

In accordance with an embodiment of the invention, the femtocell management entity 206 may be operable to communicate test parameters to each of the plurality of femtocells 202 and femtocell 230. The test parameters may comprise particular frequencies of operation, particular directions of antennas and/or particular power levels, for example. The test parameters may be based on performance information received from the newly installed femtocell 230 and one or more of the neighboring femtocells 202. The test parameters may be updated based on updated information received from one or more of the femtocells 202 and/or the femtocell 230.

The femtocell management entity 206 may be operable to communicate the determined configuration information for one or more remaining ones of the plurality of femtocells, for example, femtocells 202a and 202e to corresponding ones of one or more remaining ones of the plurality of femtocells, for example, femtocells 202a and 202e. One of the plurality of femtocells, for example, femtocell 230 may be operable to communicate one or more updated parameters from one of the plurality of femtocells, for example, femtocell 230 to the femtocell management entity 206. The femtocell management entity 206 may be operable to utilize the one or more updated parameters to determine new configuration information for one of the plurality of femtocells, for example, femtocell 230 and/or for one or more remaining ones of the plurality of femtocells, for example, femtocells 202a and 202e. One of the plurality of femtocells, for example, femtocell 230 may be operable to receive from the femtocell management entity 206, the determined new configuration information for one of the plurality of femtocells, for example, femtocell 230. The femtocell management entity 206 may be operable to communicate the determined new configuration information for the one or more remaining ones of the plurality of femtocells, for example, femtocells 202a and 202e to corresponding ones of the one or more remaining ones of the plurality of femtocells, for example, femtocells 202a and 202c.

In various embodiments of the invention, a femtocell may exchange information with the femtocell management entity 206 without intervention from a user, and may automatically update settings or other information stored on the femtocell and/or stored on the servers of the femtocell management entity 206.

Figure 3:
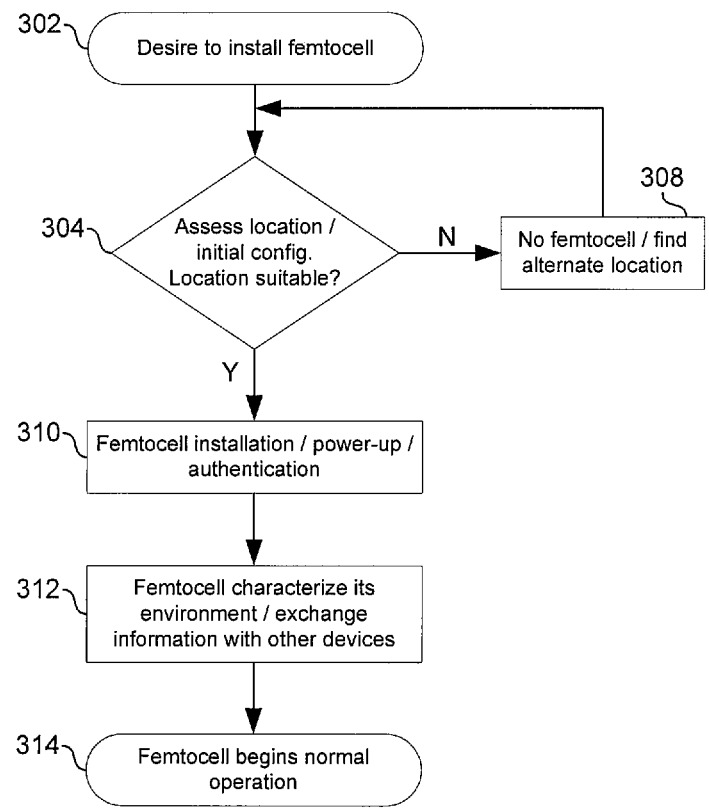
FIG. 3A is a diagram illustrating an exemplary interface for a femtocell management entity, in accordance with an embodiment of the invention.
FIG. 3B is a diagram illustrating an exemplary registry in a femtocell management entity, in accordance with an embodiment of the invention.

FIG. 3 is flow chart illustrating exemplary steps for femtocell installation and configuration, in accordance with an embodiment of the invention. Referring to FIG. 3 the exemplary steps may begin with step 302 when it is desirable to install a femtocell. In this regard, it may be desirable to install a femtocell to, for example, provide improved cellular coverage at a particular location. Subsequent to step 302, the exemplary steps may advance to step 304.

In step 304, an owner and/or operator of femtocells, which may be a cellular service provider, for example, may perform an evaluation of the desired femtocell installation location. In this regard, it may be determined whether there exists a configuration of the femtocell to be installed and/or the femtocells in the vicinity of the desired installation location that meets desired cellular coverage area and interference requirements and/or needs. In instances that the desired location is not suitable, that is, no acceptable configuration exists, the exemplary steps may advance to step 308 and a new installation location may be determined. If no alternate location is found, the femtocell may not be installed. If an alternate location is found, the exemplary steps may return to step 304. In instances that the desired installation location is suitable, information corresponding to the determined configuration may be communicated to the femtocell via, for example, a programming connection such as USB or IEEE 1394, a network such as an broadband network, or a cellular connection. Subsequently, the exemplary steps may advance to step 310.

In step 310, the femtocell may be installed in the determined location and may be powered up. Additionally, the femtocell may be verified to, for example, ensure it is allowed to operate on restricted cellular frequencies. Subsequent to step 310, the exemplary steps may advance to step 312.

In step 312, the newly installed femtocell may measure potential interference and/or otherwise characterize is surroundings. In various embodiments of the invention, the measurements and/or characterization may be performed while the femtocell is in an initialization and/or test mode. In this regard, operating parameters of the femtocell may be configured to an initial state but once the femtocell is installed and operational, the operating parameters may be updated and/or optimized. In this manner, the femtocell may be reconfigured utilizing the updated or optimized parameters. In various embodiments of the invention, a femtocell may power up in a test mode before becoming fully operational and attempting to service cellular enabled communication devices. Installed femtocells may periodically enter a test mode to optimize operating parameters. Additionally, during step 312, the femtocell may exchange information with other femtocells and/or a femtocell management entity in order to optimize one or more operating parameters of the newly installed femtocell and/or other installed femtocells. Subsequent to step 312, the exemplary steps may advance to step 314.

In step 314, the newly installed femtocell may enter a normal mode of operation and may begin providing cellular services to cellular enabled communication devices within its coverage area.

Various aspects of a method and system for installation and configuration of a femtocell are provided. In an exemplary embodiment of the invention, information for configuring a femtocell 230 (FIG. 2) to operate in a specified location 220b (FIG. 2) may be received by the femtocell 230 and may be utilized to configure one or more parameters of the femtocell 230. Once the femtocell 230 is operational, the parameters may be updated and/or optimized based on one or both of characterizations of cellular signals. Once the femtocell 230 is operational, the parameters may be updated and/or optimized based on information received from a femtocell registry 212. In this manner, the femtocell 230 may be reconfigured utilizing the updated and/or optimized parameters. The one or more parameters may be configured based on attributes of the location 220b in which the femtocell is to operate. The attributes may comprise one or more of geographical, topographical, and structural attributes. The one or more parameters may be configured based on a location, number, and/or coverage area of other femtocells 202. The location, number, and/or coverage area of the other femtocells 202 may be determined based on information gathered by mobile cellular communication devices 204. The location, number, and/or coverage area of the other femtocells 202 may be determined via the femtocell registry 212. The cellular signals may be received and characterized by the femtocell 230. The cellular signals may be received and characterized by one or more other femtocells 202 and results of said characterizations may be communicated to the femtocell 230 and/or stored in the registry 212. The one or more parameters may comprise one or more of: power levels, frequency of operation, and/or antenna beam pattern. The femtocell 230 may periodically enter a test mode to perform the reconfiguring. One or both of the configuring and reconfiguring may be performed via a femtocell management entity 206 communicatively coupled to the femtocell 230.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for installation and configuration of a femtocell.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for network management, comprising:
receiving at a femtocell information for initially configuring said femtocell for operation in a specified location;
configuring one or more parameters of said femtocell to an initial state utilizing said received information;
entering a test mode of said femtocell to adjust said one or more parameters prior to said femtocell becoming fully operational; and
reconfiguring said one or more parameters during operation of said femtocell based on one or both of characterizations of cellular signals and/or information received from a femtocell registry.

2. The method according to claim 1, wherein said configuring step further comprises configuring said one or more parameters based on attributes of said location.

3. The method according to claim 2, wherein said attributes of said location comprise one or more of geographical, topographical, and structural attributes.

4. The method according to claim 1, wherein said configuring step further comprises configuring said one or more parameters based on a location, number, and/or coverage area of other femtocells.

5. The method according to claim 4, wherein said location, number, and/or coverage area of said other femtocells is determined based on information gathered by mobile cellular communication devices.

6. The method according to claim 4, wherein said location, number, and/or coverage area of said other femtocells is determined via said femtocell registry.

7. The method according to claim 1, wherein said cellular signals are received and characterized by said femtocell.

8. The method according to claim 1, further comprising:
receiving and characterizing said cellular signals by one or more other femtocells; and
communicating results of said characterizations to said femtocell and/or storing the results in said registry.

9. The method according to claim 1, wherein said one or more parameters comprise one or more of: power levels, frequency of operation, and/or antenna beam pattern.

10. The method according to claim 1, wherein said femtocell periodically enters a test mode to perform said reconfiguring.

11. The method according to claim 1, wherein one or both of said configuring and reconfiguring is performed via a femtocell management entity communicatively coupled to said femtocell.

12. A system for network management, comprising:
one or more circuits for use in a femtocell, said one or more circuits being configured to:
receive information for initially configuring said femtocell for operation in a specified location;
configure one or more parameters of said femtocell to an initial state utilizing said received information;
enter a test mode of said femtocell to adjust said, one or more parameters prior to said femtocell becoming fully operational; and
reconfigure said one or more parameters during operation of said femtocell based on one or both of characterizations of cellular signals and/or information received from a femtocell registry.

13. The system according to claim 12, wherein said one or more circuits to configure said one or more parameters based on attributes of said location.

14. The system according to claim 13, wherein said attributes of said location comprise one or more of geographical, topographical, and structural attributes.

15. The system according to claim 12, wherein said one or more circuits configure said one or more parameters based on a location, number, and/or coverage area of other femtocells.

16. The system according to claim 15, wherein said location, number, and/or coverage area of said other femtocells is determined based on information gathered by mobile cellular communication devices.

17. The system according to claim 15, wherein said location, number, and/or coverage area of said other femtocells is determined via said femtocell registry.

18. The system according to claim 12, wherein said one or more circuits are configured to receive and characterize said cellular signals.

19. The system according to claim 12, wherein said cellular signals are received and characterized by one or more other femtocells and results of said characterizations are communicated to said femtocell and/or are stored in said registry.

20. The system according to claim 12, wherein said one or more parameters comprise one or more of: power levels, frequency of operation, or antenna beam pattern.

21. The system according to claim 12, wherein said one or more circuits are configured to periodically place said femtocell into a test mode to perform said reconfiguring.

22. The system according to claim 12, wherein one or both of said configuring and reconfiguring is performed via a femtocell management entity communicatively coupled to said femtocell.

* * * * *

UNITED STATES PATENT AND TRADEMARK OFFICE
CERTIFICATE OF CORRECTION

PATENT NO. : 8,548,455 B2  Page 1 of 1
APPLICATION NO. : 12/355444
DATED : October 1, 2013
INVENTOR(S) : Kent et al.

It is certified that error appears in the above-identified patent and that said Letters Patent is hereby corrected as shown below:

In the Claims:

Column 17
Line 23, "said, one" should be replaced with --said one--.

Column 17
Line 31, "circuits to configure" should be replaced with --circuits configure--.

Signed and Sealed this
Third Day of December, 2013

Margaret A. Focarino
*Commissioner for Patents of the United States Patent and Trademark Office*